US012251631B2

(12) United States Patent
Dai et al.

(10) Patent No.: US 12,251,631 B2
(45) Date of Patent: Mar. 18, 2025

(54) GAME THEORETIC DECISION MAKING

(71) Applicant: Honda Motor Co., Ltd., Tokyo (JP)

(72) Inventors: Siyu Dai, Cambridge, MA (US);
Sangjae Bae, San Jose, CA (US);
David F. Isele, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 415 days.

(21) Appl. No.: 17/707,043

(22) Filed: Mar. 29, 2022

(65) Prior Publication Data

US 2023/0182014 A1 Jun. 15, 2023

Related U.S. Application Data

(60) Provisional application No. 63/288,101, filed on Dec. 10, 2021.

(51) Int. Cl.
*B60W 60/00* (2020.01)
*A63F 13/47* (2014.01)
*A63F 13/803* (2014.01)
*G06N 7/01* (2023.01)

(52) U.S. Cl.
CPC ............ *A63F 13/47* (2014.09); *A63F 13/803* (2014.09); *B60W 60/0027* (2020.02); *G06N 7/01* (2023.01)

(58) Field of Classification Search
CPC ........ A63F 13/47; A63F 13/803; A63F 13/65; B60W 60/0027; B60W 60/00; G06N 7/01; G06N 3/008; G06N 5/01
USPC .......................................................... 701/27
See application file for complete search history.

(56) References Cited

U.S. PATENT DOCUMENTS

| 11,900,797 | B2 * | 2/2024 | Ramamoorthy | ....... G06N 5/045 |
| 2014/0336913 | A1 * | 11/2014 | Fino | ................. G08G 1/096844 |
| | | | | 701/465 |
| 2017/0088038 | A1 * | 3/2017 | Geller | .................... B60Q 1/507 |
| 2018/0089563 | A1 * | 3/2018 | Redding | .................. G06N 5/01 |
| 2019/0310650 | A1 * | 10/2019 | Halder | ..................... G06N 3/08 |

OTHER PUBLICATIONS

R. Bellman, "A markovian decision process," Journal of mathematics and mechanics, vol. 6, No. 5, pp. 679-684, 1957.

(Continued)

*Primary Examiner* — Shardul D Patel
(74) *Attorney, Agent, or Firm* — Rankin, Hill & Clark LLP

(57) ABSTRACT

Aspects related to game theoretic decision making may be implemented utilizing a sensor, a memory, and a processor. The sensor may detect other vehicles and corresponding attributes as an observation. The memory may store instructions. The processor may execute the instructions to perform acts, actions, or steps, such as constructing a search tree based on the observation, an initial belief, and a vehicle identified as a current opponent vehicle, performing a Monte Carlo Tree Search (MCTS) on the search tree based on a planning horizon and a time allowance to determine a desired action from a set of ego-actions, executing, via vehicle systems, the desired action, detecting an updated observation associated with one or more of the other vehicles, identifying the other vehicles to be updated as the current opponent vehicle, and updating a root node of the search tree based on the current opponent vehicle.

20 Claims, 7 Drawing Sheets

(56) References Cited

OTHER PUBLICATIONS

A. Dreves and M. Gerdts, "A generalized nash equilibrium approach for optimal control problems of autonomous cars," Optimal Control Applications and Methods, vol. 39. No. 1, pp. 326-342, 2018.

R. D. McKelvey and T. R. Palfrey, "Quantal response equilibria for normal form games," Games and economic behavior, vol. 10, No. 1. pp. 6-38, 1995.

M. Naumann, L. Sun, W. Zhan, and M. Tomizuka, "Analyzing the suitability of cost functions for explaining and mitating human driving behavior based on inverse reinforcemem learning," in 2020 IEEE International Conference on Robotics and Automation (ICRA). IEEE, 2020, pp. 5481-5487.

M. Ono and B. C. Williams, "Iterative risk allocation: A new approach to robust model predictive control with a joint chance constraint," in 2008 47th IEEE Conference on Decision and Control. IEEE, 2008, pp. 3427-3432.

D. O. Stahl II and P. W. Wilson, "Experimental evidence on players' models of other players," Journal of economic behavior & organization, vol. 25, No. 3, pp. 309-327, 1994.

M. Wang, Z. Wang, J. Talbot. J.C. Gerdes, and M. Schwager, "Game-theoretic planning for self-driving cars in multivehicle competitive scenarios," IEEE Transactions on Robotics, 2021.

Q. Zhang, R. Langari, H. E. Tseng, D. Filev, S. Szwabowski, and S. Coskun, "A game theoretic model predictive controller with aggressiveness estimation for mandatory lane change," IEEE Transactions on Intelligent Vehicles, vol. 5, No. 1, pp. 75-89, 2019.

G. Agamennoni, J. I. Nieto, and E. M. Nebot. "A bayesian approach for driving behavior inference," in 2011 IEEE Intellegent Vehicles Symposium (IV). IEEE, 2011, pp. 595-600.

S. Bae, D. Saxena, A. Nakhaei, C. Choi, K. Fujimura, and S. Moura, "Cooperation-aware lane change maneuver in dense traffic based on model predictive control with recurrent neural network," in 2020 American Control Conference (ACC). IEEE, 2020, pp. 1209-1216.

R. P. Bhattacharyya, D. J. Phillips, C. Liu, J. K. Gupta, K. Driggs-Campbell, and M. J. Kochenderfer. "Simulating emergent properties of human driving behavior using multi-agent reward augmented imitation learning," in 2019 International Conference on Robotics and Automation (ICRA). IEEE 2019, pp. 789-795.

M. Bouton, A. Nakhaei, D. Isele, K. Fujimura, and M. J. Kochenderfer, "Reinforcement learning with iterative reasoning for merging in dense traffic," in 2020 IEEE 23rd International Conference on Intelligent Transportation Systems (ITSC). IEEE, 2020, pp. 1-6.

Y. Breitmoser, J. H. Tan, and D. J. Zizzo, "On the beliefs off the path: Equilibrium refinement due to quantal response and level-k," Games and Economic Behavior, vol. 86, pp. 102-125, 2014.

G. Chaslot, S. Bakkes, I. Szita, and P. Spronck. "Monte-carlo tree search: A new framework for game ai." AIIDE, vol. 8. pp. 216-217, 2008.

M. A. Costa-Gomes and V. P. Crawford, "Cognition and behavior in two-person guessing games: An experimental study," American economic review, vol. 96, No. 5, pp. 1737-1768, 2006.

M. A. Costa-Gomes, V. P. Crawford, and N. Iriberri, "Comparing models of strategic thinking in van huyck, battalio, and beil's coordination games," Journal of the European Economic Association, vol. 7, No. 2-3, pp. 365-376, 2009.

S. Dai, S. Schaffert, A. Jasour, A. Hofmann, and B. Williams, "Chance constrained motion planning for high-dimensional robots," in 2019 International Conference on Robotics and Automation (ICRA). IEEE, 2019, pp. 8805-8811.

A. Dosovitskiy, G. Ros, F. Codevilla, A. Lopez, and V. Koltun, "CARLA: An open urban driving simulator," in Proceedings of the 1st Annual Conference on Robot Learning, 2017, pp. 1-16.

J. F. Fisac, E. Bronstein, E. Stefansson, D. Sadigh, S. S. Sastry, and A. D. Dragan, "Hierarchical game-theoretic planning for autonomous vehicles," in 2019 International Conference on Robotics and Automation (ICRA). IEEE, 2019, pp. 9590-9596.

P. Hang, C. Lv, Y. Xing, C. Huang, and Z. Hu, "Human-like decision making for autonomous driving: A noncooperative game theorectic approach" IEEE Transactions on Intellegent Transportation Systems. vol. 22, No. 4, pp. 2076-2087, 2020.

D. Isele, "Interactive decision making for autonomous vehicles in dense traffic," in 2019 IEEE Intelligent Transportation Systems Conference (ITSC). IEEE, 2019, pp. 3981-3986.

L. Kocsi and C. Szepevári, "Bandit based monte-carlo planning," in European conference on machine learning. Springer, 2006, pp. 282-293.

S. Li, N. Li, A. Girard, and I. Kolmanovsky, "Decision making in dynamic and interactive environments based on cognitive hierarchy theory, bayesian inference, and predictive control," in 2019 IEEE 58th Conference on Decision and Control (CDC). IEEE, 2019, pp. 2181-2187.

A. Liniger and J. Lygeros, "A noncooperative game approach to autonomous racing," IEEE Transactions on Control Systems Technology, vol. 28, No. 3, pp. 884-897, 2019.

M. Lutter, S. Mannor, J. Peters, D. Fox, and A. Garg, "Value iteration in continuous actions, states and time," in Proceedings of the 38th International Conference on Machine Learning, 2021, pp. 7224-7234.

S. Sekizawa, S. Inagaki, T. Suzuki, S. Hayakawa, Tsuchida, T. Tsuda. and H. Fujinami. "Modeling and recognition of driving behavior based on stochastic switched arx model," IEEE Transactions on Intelligent Transportation Systems, vol. 8, No. 4, pp. 593-606, 2007.

D. Silver and J. Veness, "Monte-carlo planning in large pomdps," Advances in Neural Information Processing Systems. vol. 23, pp. 2164-2172, 2010.

R. Tian, L. Sun. M. Tomizuka, and D. Isele. "Anytime game-theoretic planning with active reasoning about human's latent states for human-centered robots," in 2021 International Conference on Robotics and Automation (ICRA). IEEE, 2021.

M. Treiber, A. Hennecke, and D. Helbing, "Congested traffic states in empirical observations and microscopic simulations." Physical review E, vol. 62, No. 2, p. 1805, 2000.

X. Vives, "Nash equilibrium with strategic complementarities." Journal of Mathematical Economics, vol. I9, No. 3, pp. 305-321, 1990.

H. Von Stackelberg, Market structure and equilibrium. Springer Science & Business Media, 2010.

G. Williams, B. Goldfain, P. Drews, J.M. Rehg, and E. A. Theodorou, "Best response model predictive control for agile interactions between autonomous ground vehicles," in 2018 IEEE International Conference on Robotics and Automation (ICRA). IEEE, 2018, pp. 2403-2410.

J. R. Wright and K. Leyton-Brown. "Level-0 meta-models for predicting human behavior in games," in Proceedings of the fifteenth ACM conference on Economics and computation, 2014, pp. 857-874.

J. Yoo and R. Langari, "A game-theoretic model of human driving and application to discretionary lane-changes," arXiv preprint arXiv:2003.09783, 2020.

Z. Zhang and J. F. Fisac, "Safe Occlusion-Aware Autonomous Driving via Game-Theoretic Active Perception," in Proceedings of Robotics: Science and Systems, Virtual, Jul. 2021.

\* cited by examiner

GAME THEORETIC DECISION MAKING

CROSS-REFERENCE TO RELATED APPLICATIONS

This application claims the benefit of U.S. Provisional Patent Application, Ser. No. 63/288,101 entitled "GAME THEORETIC DECISION MAKING BY ACTIVELY LEARNING HUMAN INTENTIONS", filed on Dec. 10, 2021; the entirety of the above-noted application(s) is incorporated by reference herein.

BACKGROUND

Interacting with other human drivers may be a challenge faced by autonomous vehicles (AVs). Human driving behaviors may be very diverse and are often influenced by many factors, including the driver's personality and a current traffic scenario. Obtaining an accurate estimate of the other drivers' behavior models may be useful in dense traffic and the successful completion of the autonomous vehicle's objective. Learning-based approaches for modeling human driving behaviors have achieved impressive results in recent literature, but inevitably face the demand for a large amount of training data and may produce trained models that are non-trivial to interpret. Methods based on probabilistic inference may provide more interpretable models, but much of the literature focuses on modeling and recognition.

BRIEF DESCRIPTION

According to one aspect, a system for game theoretic decision making may include a sensor, a memory, and a processor. The sensor may detect one or more other vehicles and corresponding attributes as an observation. The memory may store one or more instructions. The processor may execute one or more of the instructions stored on the memory to perform one or more acts, actions, or steps, such as constructing a search tree based on the observation, an initial belief, and a vehicle identified as a current opponent vehicle, performing a Monte Carlo Tree Search (MCTS) on the search tree based on a planning horizon and a time allowance to determine a desired action from a set of ego-actions, executing, via one or more vehicle systems, the desired action, detecting, via the sensor, an updated observation associated with one or more of the other vehicles, identifying one or more of the other vehicles to be updated as the current opponent vehicle, and updating a root node of the search tree based on the current opponent vehicle.

The performing the MCTS on the search tree may include performing a tree rollout based on the root node of the search tree and the planning horizon to expand, simulate, and backpropagate the search tree. The performing the tree rollout may include prioritizing unsampled actions. The processor may compute a policy for the current opponent vehicle based on a current belief and a pre-computed Quantal Level-k function. The processor may sample one or more opponent actions from the policy for the current opponent vehicle. The processor may assign a default action to non-opponent vehicles of the one or more other vehicles. The expanding the search tree may include generating a child node for a current node based on an ego-action and an opponent action being non-existent within one or more child nodes of the root node. The processor may calculate a reward associated with the child node based on a reward function, a discount factor, and an information gain. The information gain may be represented by a difference in entropy between the current node and the child node. The information gain may be represented by a difference in entropy between a belief associated with the current node and a belief associated with the child node.

According to one aspect, a computer-implemented method for game theoretic decision making may include detecting, via a sensor, one or more other vehicles and corresponding attributes as an observation, constructing a search tree based on the observation, an initial belief, and a vehicle identified as a current opponent vehicle, performing a Monte Carlo Tree Search (MCTS) on the search tree based on a planning horizon and a time allowance to determine a desired action from a set of ego-actions, executing, via one or more vehicle systems, the desired action, detecting, via the sensor, an updated observation associated with one or more of the other vehicles, identifying one or more of the other vehicles to be updated as the current opponent vehicle, and updating a root node of the search tree based on the current opponent vehicle.

The performing the MCTS on the search tree may include performing a tree rollout based on the root node of the search tree and the planning horizon to expand, simulate, and backpropagate the search tree. The performing the tree rollout may include prioritizing unsampled actions. The computer-implemented method for game theoretic decision making may include computing a policy for the current opponent vehicle based on a current belief and a pre-computed Quantal Level-k function, sampling one or more opponent actions from the policy for the current opponent vehicle, or assigning a default action to non-opponent vehicles of the one or more other vehicles.

According to one aspect, a game theoretic decision making vehicle may include one or more vehicle systems, a sensor, a memory, and a processor. The sensor may detect one or more other vehicles and corresponding attributes as an observation. The memory may store one or more instructions. The processor may execute one or more of the instructions stored on the memory to perform one or more acts, actions, or steps, such as constructing a search tree based on the observation, an initial belief, and a vehicle identified as a current opponent vehicle, performing a Monte Carlo Tree Search (MCTS) on the search tree based on a planning horizon and a time allowance to determine a desired action from a set of ego-actions, executing, via one or more of the vehicle systems, the desired action, detecting, via the sensor, an updated observation associated with one or more of the other vehicles, identifying one or more of the other vehicles to be updated as the current opponent vehicle, and updating a root node of the search tree based on the current opponent vehicle.

The performing the MCTS on the search tree may include performing a tree rollout based on the root node of the search tree and the planning horizon to expand, simulate, and backpropagate the search tree. The performing the tree rollout may include prioritizing unsampled actions. The processor may compute a policy for the current opponent vehicle based on a current belief and a pre-computed Quantal Level-k function.

DETAILED DESCRIPTION

Figure 1:
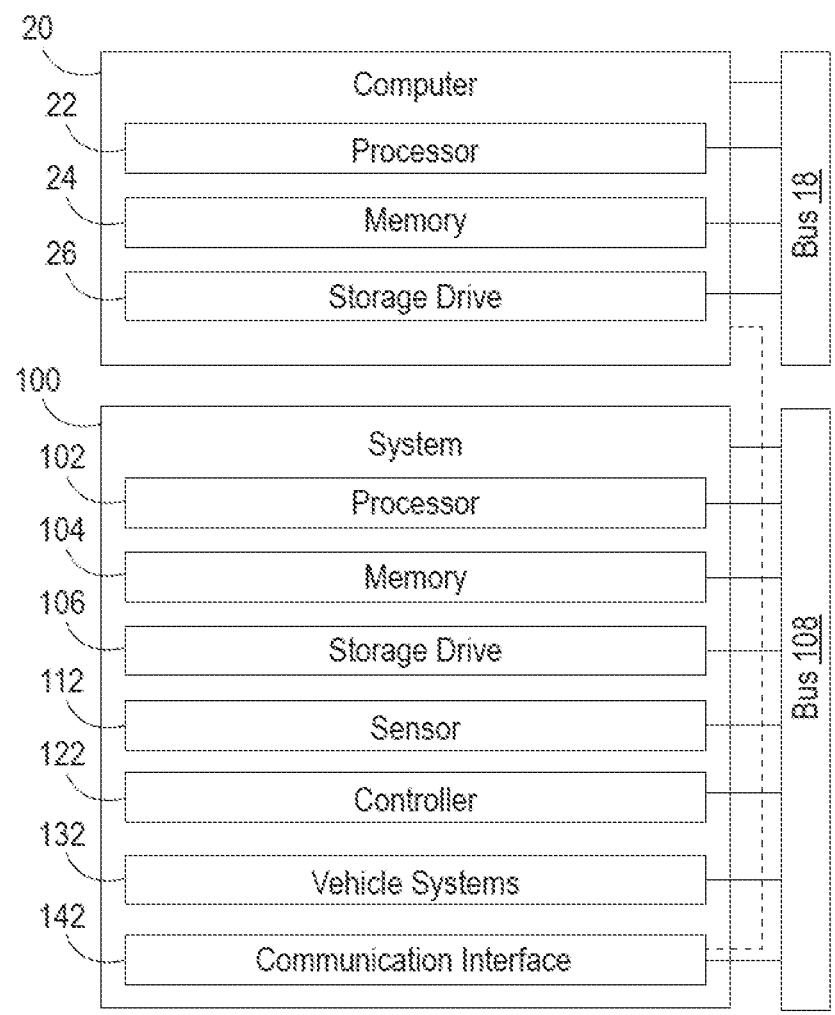
FIG. 1 is an exemplary component diagram of a system for game theoretic decision making, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, and/or driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Generally described, the present disclosure provides an ability to estimate human intentions accurately and interact with human drivers intelligently for autonomous vehicles in order to successfully achieve their objectives. A game theoretic planning algorithm that models human opponents with an iterative reasoning framework and estimates human latent cognitive states through probabilistic inference and active learning is provided via a system for game theoretic decision making. By modeling the interaction as a partially observable Markov decision process (POMDP) with adaptive state and action spaces, the algorithm may accomplish real-time lane changing tasks in a realistic driving simulator. The algorithm's lane changing performance in dense traffic is compared with a state-of-the-art autonomous lane changing algorithm to show the advantage of iterative reasoning and active learning in terms of mitigating overly conservative behaviors and achieving the driving objective successfully.

The system for game theoretic decision making may implement game theory and probabilistic inference in order to reason about and/or model human drivers' behavior and achieve an autonomous vehicle's (AV) objective through successful interactions. In order to take human drivers' diverse driving styles and cognitive levels into account, the system for game theoretic decision making may utilize quantal level-k reasoning theory and model human's distinct behaviors with intelligence levels and rationality coefficients. Intelligence levels may describe how sophisticated an agent believes the agent's opponents are when reacting to their actions, whereas rationality coefficients may describe how close an agent is to a perfect maximizer. The system for game theoretic decision making may model the interactions between the system for game theoretic decision with human drivers as a partially observable Markov decision process (POMDP) and may apply probabilistic inference to reason about their intelligence levels and degrees of rationality. Rather than passively adapting to humans' behaviors, the system for game theoretic decision making may actively learn humans' latent states in order to plan for actions that optimize the system for game theoretic decision's own objective. Further, the system for game theoretic decision making may adapt to diverse scenarios with multiple opponent agents. A desired action may be selected based on a Monte Carlo Tree Search (MCTS).

FIG. 1 is an exemplary component diagram of a system 100 for game theoretic decision making, according to one aspect. A computer 20 may include a bus 18, a processor 22, a memory 24, and a storage drive 26. The bus 18 may operably connect the processor 22, the memory 24, and the storage drive 26 of the computer 20. The processor 22 of the computer 20 may, during an offline phase, pre-compute one or more Quantal Level-k function, for use by the system 100 for game theoretic decision making.

The system 100 for game theoretic decision making may include a processor 102, a memory 104, a storage drive 106, a bus 108 operably connecting one or more components of the system 100 for game theoretic decision making, one or more sensors 112, a controller 122 controlling one or more vehicle systems 132, and a communications interface 142. The memory 104 may store one or more instructions (e.g., instructions of an algorithm or a method) and the processor 102 may execute one or more of the instructions stored on the memory 104 to perform one or more acts, one or more actions, one or more steps, etc. The system 100 for game theoretic decision making may by implemented on a vehicle or as a game theoretic decision making vehicle.

The sensors 112 may detect one or more other vehicles and corresponding attributes as an observation.

The communications interface 142 may receive the one or more pre-computed Quantal Level-k functions from the computer and the store the one or more pre-computed Quantal Level-k functions to the storage drive 106 or the memory 104.

Quantal Level-k Reasoning (QRE)

The processor 102 may model a vehicle equipped with the system 100 for game theoretic decision making as an 'agent' and other vehicles as 'opponents' or 'opponent agents' according to quantal response equilibrium (QRE) in a simulation environment. In other words, as used herein, an 'ego-agent' or 'ego-vehicle' may refer to the vehicle (e.g., which may be an autonomous vehicle or AV) equipped with the system for game theoretic decision or a game theoretic decision making vehicle and an 'opponent', 'other agent', or 'opponent agent' may refer to other vehicles within the operating environment.

Quantal level-k reasoning generally may be a game theoretic modeling technique that combines QRE models and level-k reasoning. QRE may model an imperfect maximization of expected payoffs using stochastic choices, hence QRE may be a more realistic model for human players than the sharp best responses according to standard game theory. Level-k reasoning theory additionally may model how players form conjectures about their co-players' strategies and may assume that players choose actions according to their beliefs. In the quantal level-k (ql–k) reasoning model, players may be divided into k intelligence levels, and players may react to opponent actions by assuming that the opponents are at a lower intelligent level than themselves. A ql–0 agent may be assumed to be non-strategic, and a ql–k agent, $k \in N^+$, may believe that the ql–k agent's opponent may be a ql–(k–1) agent and may choose actions according to the QRE model. The stochastic behavior of each agent may be modeled by a rationality coefficient $\lambda \in R$. $Q^i(s, a^i|a^{-i})$ may denote the expected total reward agent i achieves when executing action $a^i$ at states against an action $a^{-i}$ from its opponent –i, then the policy of a ql–k agent with rationality $\lambda$ may be expressed as:

$$\pi^i(a^i \mid s; a^{-i}) = \frac{\exp(\lambda Q^i(s, a^i \mid a^{-i}))}{\sum_{a' \in A^i} \exp(\lambda Q^i(s, a' \mid a^{-i}))} \quad (1)$$

Explained yet another way, a level 0 agent may, for example, be assumed to be travelling at a constant velocity, with respect to autonomous driving. A level 1 agent may assume other agents are level 0 agents and may select an autonomous driving action based on the assumption that other agents are level 0 agents. A level 2 agent may assume other agents are level 1 agents and may select an autonomous driving action based on the assumption that other agents are level 1 agents, and so forth. In this way, the k-level may represent a depth of reasoning. $\lambda$ may represent a rationality constant associated with noise to account for the fact that agents may not always behave rationally.

Modeling the Decision Making Problem

The processor 102 may model the decision-making problem faced by an autonomous vehicle equipped with the system 100 for game theoretic decision making when interacting with human drivers as a POMDP. s=[x, θ] may represent a state in the POMDP, where x may denote the physical states (including $x^e$ for the ego-vehicle (i.e., the autonomous vehicle equipped with the system 100 for game theoretic decision making) and $x^i$, i=1, 2, ..., n for n other vehicles) and θ may denote the internal states that dominate the opponents' behavior. The system 100 for game theoretic decision making may assume that all physical states are fully observable and all opponents' internal states are hidden, and denote the observations as o. The observation o may include behaviors, position information, velocity, etc. of the opponent and or confidence associated with respective characteristics.

The system 100 for game theoretic decision making may denote the action space of the ego-vehicle as $A^e$, and assume all human or other vehicles have the same action space $A^{\mathcal{H}}$. The system 100 for game theoretic decision making may assume the opponents hidden state θ does not change with t during the decision-making process. The ego-agent (i.e., the autonomous vehicle equipped with the system 100 for game theoretic decision making) may maintain a belief on the probability distribution over states b(s). Thus, the processor 102 may model the POMDP problem as follows:

$$\underset{\pi}{\text{maximize}} \; V(\pi) = \mathbb{E}\left[\Sigma_{t=0}^{\infty} \gamma^t r(b_t, a_t^e)\big|a_t^e \sim \pi\right]$$

subject to $x_t t = f(x_t, a_t^e, a_t^1, \ldots, a_t^n)$ $a_t^e \in A^e, a_t^i \in A^H, i = 1, 2, \ldots, n$ $o = x, s = [x, \theta]$ $b_{t+1}(s_{t+1}) = \rho(b_t(s_t), o_{t+1})$ where π is a policy, r may be the reward function, γ may be the discount factor, $f$ may be a known dynamics function governing the transition of physical states, and ρ may be a belief update function.

Explained another way, the processor 102 may determine a desired policy π which maximizes the reward r via the Monte Carlo Tree Search (MCTS), which is a stochastic random sampling technique utilized to mitigate computation costs.

Algorithm for Solving Modeling the Decision Making Problem

As previously discussed, the processor 22 of the computer 20 may, during an offline phase, pre-compute one or more Quantal Level-k function, for use by the system 100 for game theoretic decision making and the communications interface may receive the one or more pre-computed Quantal Level-k functions from the computer and the store the one or more pre-computed Quantal Level-k functions to its storage drive 106 or the memory 104. Explained another way, the system 100 for game theoretic decision making may model human opponents as ql–k agents and pre-compute their policies offline as the pre-computed Quantal Level-k functions. According to one aspect, the processor 102 for the system 100 for game theoretic decision making may set the hidden state to be $\theta=[k^i, \lambda^i]$, i=1, 2, ..., n and solve the POMDP online with a Monte Carlo Tree Search (MCTS) by propagating beliefs according to the pre-computed policies.

Quantal Level-k Policies

In order to achieve real-time belief update during online planning, the system 100 for game theoretic decision making may pre-compute the Q value function for perfectly rational agents at each level k to store in the memory 104, and compute the quantal policies using Equation (1) according to the ego-agent's (i.e., system 100 for game theoretic decision making) belief on $k^i$ and $\lambda^i$ during online belief propagation. The system 100 for game theoretic decision making may assume the non-strategic level-0 policy is given, and a perfectly rational level-k agent maximizes the objective:

$$V_{\pi^{i,k}}(s_0) = \mathbb{E}_{\pi^{-i,k-1}}[\Sigma_{t=0}^{\infty} \gamma^t r(s_t, a_t^{i,k})|a_t^{i,k} \sim \pi^{i,k}].$$

According to one aspect, the system 100 for game theoretic decision making may assume all human drivers follow the ql–k policies and only differ in terms of the internal states θ, hence during the value function pre-computation, the system 100 for game theoretic decision making may merely consider a two-player game or scenario with one human vehicle and one ego-vehicle. $V^{i,k}$ may be computed using value iteration when the state space is discrete and fitted value iteration when the state space is continuous. With the value function $V^{i,k}$, the system 100 for game theoretic decision making may compute the Q function using the following equation:

$$Q^{i,k}(s_t, a_t^{i,k}) = \mathbb{E}_{\pi^{-i,k-1}}[r(s_t, a_t^{i,k}) + \gamma V^{i,k}(s_{t+1})] \quad (2)$$

The system 100 for game theoretic decision making may precompute the Q functions offline and compute ql–k policies during online planning. This may be advantageous and enable the system 100 for game theoretic decision making to save memory space because there would be no need to store the level-k policies for every possible λ value on board the memory 104 or the storage drive 106. Additionally, the framework may be extended to incorporate the entire continuous set of λ values rather than pre-specifying a few discrete values.

Game Theoretic Planning and Search Tree Construction

The processor 102 may construct a search tree. For example, the processor 102 may construct a search tree (e.g., initial search tree) based on the observation from the sensors 112, an initial belief, and a vehicle identified as a current opponent vehicle.

During online planning, the system 100 for game theoretic decision making may construct the search tree which stores the current observation and current belief with the root node as root.x and root.b, respectively. In order to mitigate the exponential increase of the tree expansion breadth as the number of opponents increases, the system 100 for game theoretic decision making may merely select up to two opponents during tree search according to their relative positions to the ego-vehicle.

According to one aspect, the system 100 for game theoretic decision making may first identify the nearest two human vehicles as opponents, and if both the nearest vehicles are in front of or behind the ego-agent, the system 100 for game theoretic decision making may only consider the nearest one as the opponent agent. Otherwise, both the nearest two vehicles may be considered as opponents. The remaining vehicles in the scene may be considered as obstacles which may be assumed to maintain speed.

Game Theoretic Planning Algorithm Inputs Overview

Inputs:
 E: environment
 n: total number of other detected vehicles
 H: planning horizon
 T: time allowance for MCTS
 γ: discount factor
 φ: information gain reward coefficient
 $b_0$: initial belief
 $Q_k$: precomputed Q function, k=1, ..., $k_{max}$
 $\mathcal{H}$ : entropy Game Theoretic Planning Algorithm Overview The processor 102, memory 104, storage drive 106, etc. may be setup or configured to run, implement, or execute the Game Theoretic Planning Algorithm described herein.

```
1      o ← take initial observation using sensors 112
2      oppo_id ← SelectOpponent(o)
3      Tree ← ConstructTree(o,b₀,oppo id)
4      while not success do
5      |  desired action ← Tree.search(H,T)
6      |  execute desired action and take updated observation o in E
7      |  oppo_id ← SelectOpponent(o)
8      |  Tree.UpdateRoot(o)
9      |  Tree.UpdateOppo(oppo_id)
10
11     Function Tree.searched(H, T):
12     |  while time elapsed < T do Tree.rollout(root, H)
13     |  desired action ← argmaxₐ root, values(α)
14     |  return desired action
15
16     Function Tree.rollout(node, H):
17     |  if node, depth = H then return 0
18     |  if len(node.unsampled as) > 0 then
19     |  |  aᵉ ← random action from node, unsampled_as
20     |  else
```

$$21 \quad a^e \leftarrow \text{argmax}a \; \text{node.values}(a) + c\sqrt{\frac{\log \text{node}.N}{\text{node}.N_a(a)}}$$

```
22     |  for i in n do
23     |  |  if i = oppo_id then
24     |  |  |  π° ← ComputePolicy(node.b[i], Qᵏ)
25     |  |  |  Sample a° [i] ~ n°
26     |  |  else
27     |  |  |  a° [i] ← default action
28     |  if (aᵉ, a°) not in node, children then expand (aᵉ, a°)
29     |  child ← node. children(aᵉ, a°)
30     |  R = child.r + γ * Tree.rollout(child, H)
31     |  node.N + = 1
32     |  node.Nₐ(aᵉ) + = 1
33     |  node.values(aᵉ) + = R - node, values(aᵉ)
34     |  return R
35
36     Function node. expand(aᵉ, a°):
37     |  child.x,r ← Simulate (node. x, aᵉ, a°)
38     |  child.b ← Belief Update (node, x, node.b, child.x)
39     |  info_gain = Pi ∈ oppo_id(ℋ(node.b) - H(child.b))
40     |  child.r = r + φ * info_gain
41     |  node.children(aᵉ, a°) ← child
```

Game Theoretic Planning Algorithm Overview describes a game theoretic planning procedure for the system 100 for game theoretic decision making. The game theoretic planning procedure may utilize a tree structure that conducts rollouts to a depth equal to the planning horizon H until the timeout and returns the current desired action based on the rewards of the rollouts. The tree may include nodes that store the state node.x, a list of children indexed by the ego-action $a^e$ and opponent actions $a^o$, belief on opponents' hidden states node.b, and the values of different ego-actions node.values. During rollout, ego-actions that have never been sampled (node.unsampled_as) may be prioritized, and if there are no more unsampled actions, an action with the highest UCT score may be selected, which considers both its value and the number of times it has been sampled (e.g., lines 18-21 of the Game Theoretic Planning Algorithm Overview). Human agents (e.g., other drivers, other vehicles, other agents, etc.) that are viewed as opponents may be assumed to take a no-operation or no-op action, i.e., maintaining constant velocity. Opponent agents' ql–k policies may be computed using Equation (1) with pre-computed $Q^k$ value functions, and their actions may be sampled from the policy distribution weighted by the belief state node.b. The processor 102 may keep track for each node, the total number of times it has been sampled (node.N) and the number of times each action has been sampled (node.$N_a$). The value of each action may be computed by averaging the reward each rollout has achieved (e.g., line 33 of the Game Theoretic Planning Algorithm Overview).

During node expansion or creation of a new node (e.g., lines 36-41 of the Game Theoretic Planning Algorithm Overview), the state of the child node child.x and the reward r may be estimated by the simulator or processor 102, and the belief state of the child node child.b may be updated based on the opponent actions $a^o$ that led to the expansion of this child node (e.g., lines 37-38 of the Game Theoretic Planning Algorithm Overview). When simulating, actions may be taken to determine a sense of how things are further down the tree. Line 38 of the Game Theoretic Planning Algorithm Overview may represent updating a belief about how another agent is acting based on a current belief, a current node, and additional information (e.g., information gain) from child nodes of the current node.

In order to facilitate active learning of the human latent states, the system 100 for game theoretic decision making may augment the reward with an information gain reward that measures the reduction in the total entropy of the belief states on each opponent agent. The system 100 for game theoretic decision making may use an information gain reward coefficient φ to control the weight of this information gain reward during rollouts (e.g., lines 39-40 of the Game Theoretic Planning Algorithm Overview). For example, if an action of an opponent is provided in a way that increases a belief, more information gain may be provided, which may be contributed to or attributed to the reward returned.

After a desired action is returned by the search tree, the ego-agent may execute this action and observe the environment's physical state o. When planning for the next action, the processor 102 of the system 100 for game theoretic decision making may reevaluate which other agents should be considered as opponents and prune sections of the search tree that may be no longer possible by reassigning the current observation as the new root node. The system 100 for game theoretic decision making may repeat this search procedure until the goal has been achieved. An example illustration of the algorithm with planning horizon H=2 and two available ego-vehicle actions is described in greater detail with reference to FIG. 5 herein.

The system 100 for game theoretic decision making may provide many advantages and benefits. First, instead of pre-computing and storing in memory 104 the entire transition matrix of the POMDP, the system 100 for game theoretic decision making may take advantage of the discretized state and action space and the known dynamics function to conduct online tree expansion and rollouts. Other algorithms may be constrained within abstract grid-world applications due to memory consumption and re-training the level-k policies and transition matrices when opponents have unseen rationality coefficient values. By contrast, the system 100 for game theoretic decision making may be adaptable to various scenarios through state-space mapping and may maintain real-time planning performance through MCTS. Second, other ego-vehicles have traditionally been restricted to follow a ql–k policy and the values of tree nodes may be estimated using pre-computed ql–k value functions, whereas the ego-agent according to the present disclosure may be able to plan for the desired action according to the true value without being restricted by the ql–k policy. Additionally, traditional algorithms may only be applied in scenarios with one other agent, whereas the system 100 for game theoretic decision making may be adapted to scenarios with an arbitrary number of human agents in the scene.

Monte Carlo Tree Search (MCTS)

Generally, Monte Carlo Tree Search (MCTS) is a heuristic search approach for problems where solutions may be difficult or impossible to solve. MCTS addresses dimensionality by sampling state transitions rather than considering all possible state transitions when estimating the potential long-term reward. MCTS converges to an optimal policy when exploration may be controlled appropriately. During roll-outs, MCTS may select a next node to expand greedily according to an Upper Confidence bounds applied to Trees (UCT) algorithm which augments an action reward by an exploration bonus. MCTS may continue to conduct rollouts until a timeout and may return as current desired action. The system 100 for game theoretic decision making may apply MCTS to solve a POMDP and adapt the MCTS to operate within a multi-player or multi-agent environment and incorporate an active learning aspect.

In this regard, the processor 102 may perform a Monte Carlo Tree Search (MCTS) on the search tree. For example, the processor 102 may perform the MCTS on the search tree based on a planning horizon and a time allowance to determine a desired action from a set of ego-actions for the ego-agent. The MCTS or the performing the MCTS on the search tree may include performing a tree rollout based on the root node of the search tree and the planning horizon to expand, simulate, and backpropagate the search tree. The performing the tree rollout may include prioritizing unsampled actions. The processor 102 may assign a default action to non-opponent vehicles of the one or more other vehicles. The processor 102 may compute a policy for the current opponent vehicle based on a current belief and a pre-computed Quantal Level-k function. The processor 102 may sample one or more opponent actions from the policy for the current opponent vehicle. The expanding the search tree may include generating a child node for a current node based on an ego-action and an opponent action being non-existent within one or more child nodes of the root node.

The processor 102 may calculate a reward associated with the child node based on a reward function, a discount factor, and an information gain. The information gain may be represented by a difference in entropy between the current node and the child node. The information gain may be represented by a difference in entropy between a belief associated with the current node and a belief associated with the child node. The processor 102 and/or controller 122 may execute the desired action via one or more of the vehicle systems 132 to facilitate autonomous operation of the AV. In other words, the processor 102 may implement the desired action, thereby causing the system for game theoretic decision or the game theoretic decision making vehicle to take some action (e.g., change lanes, accelerate, decelerate, stop, etc.).

The sensors 112 may detect one or more other vehicles and corresponding attributes as another observation (e.g., as an updated observation, second observation, third observation, etc.). The processor 102 may identify one or more of the other vehicles to be updated as the current opponent vehicle. The processor 102 may update a root note of the search tree based on the current opponent vehicle.

Figure 2:
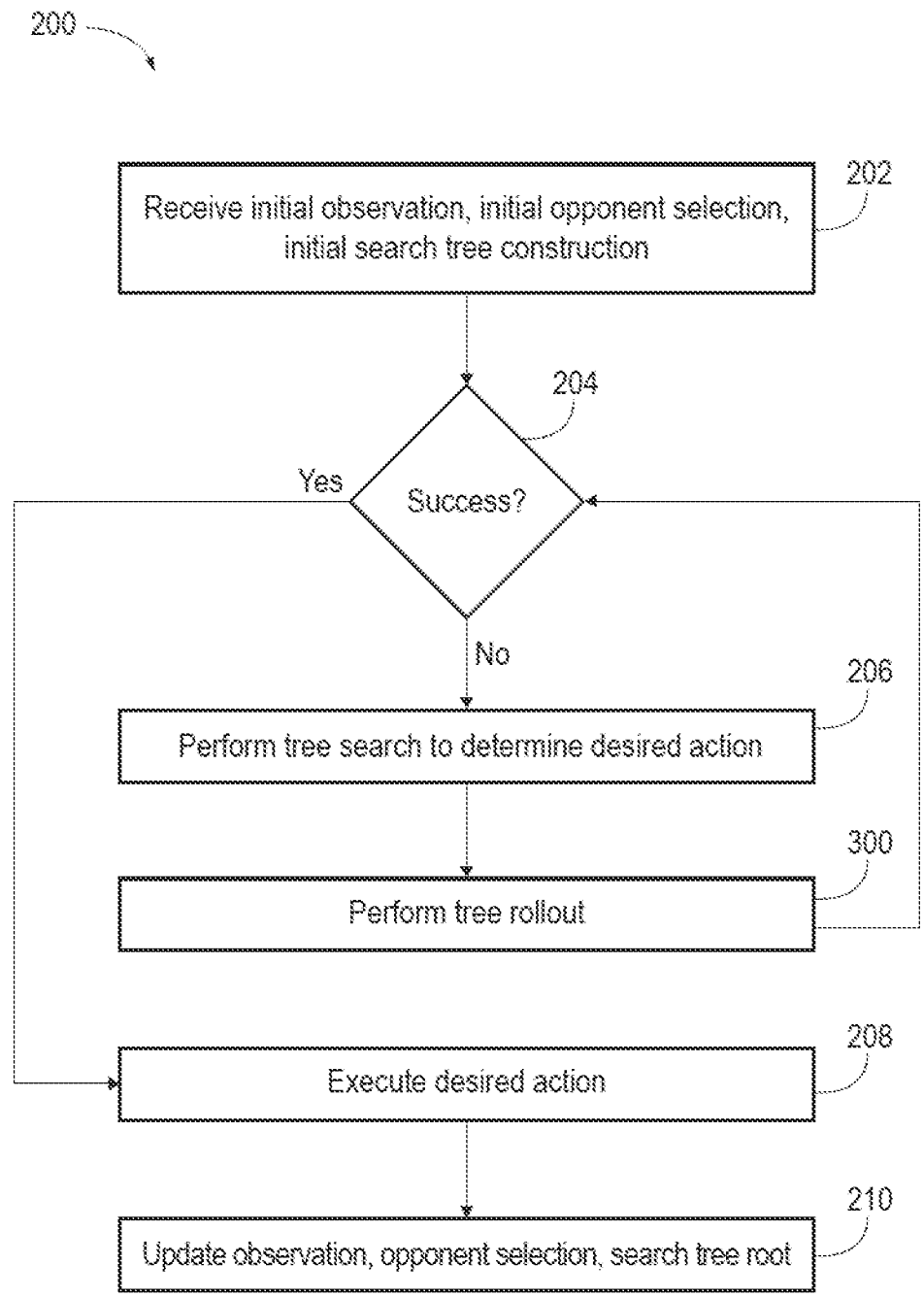
FIG. 2 is an exemplary flow diagram of a method for game theoretic decision making, according to one aspect.

FIG. 2 is an exemplary flow diagram of a method 200 for game theoretic decision making, according to one aspect. According to one aspect, the method 200 for game theoretic decision making may include receiving 202 an initial observation (e.g., line 1 of the Game Theoretic Planning Algo-rithm Overview), an initial opponent selection (e.g., line 2 of the Game Theoretic Planning Algorithm Overview), and constructing a search tree (e.g., line 3 of the Game Theoretic Planning Algorithm Overview). At 204, a check for success is performed (e.g., line 4 of the Game Theoretic Planning Algorithm Overview).

If not successful, the method 200 for game theoretic decision making may execute 206 a tree search to determine or return a desired actions (e.g., lines 5 and 11-14 of the Game Theoretic Planning Algorithm Overview). The tree search may be performed to the planning horizon H, which may be a number of steps to be predicted into the future and to a time allowance T for the MCTS. Thereafter, a tree rollout method 300 may be performed (e.g., lines 12-14 of the Game Theoretic Planning Algorithm Overview). If successful, the method 200 for game theoretic decision making may execute 208 the desired actions returned from the tree search (e.g., line 6 of the Game Theoretic Planning Algorithm Overview). At 210, the observation may be updated, the opponent section updated, and the tree root updated (e.g., lines 7-9 of the Game Theoretic Planning Algorithm Overview).

Explained another way, the loop between lines 4-9 of the Game Theoretic Planning Algorithm Overview may be considered as real world occurrences and a desired action may be selected, executed, and observations based on the executed actions may be received or made (e.g., perceive how the surroundings or environment changes based on the executed action). To mitigate computational expenses, the processor 102 may select a handful of opponents or a single opponent to focus on (e.g., line 7 of the Game Theoretic Planning Algorithm Overview). The updating of the tree root and the updating of the opponent from lines 4-9 of the Game Theoretic Planning Algorithm Overview may be considered as updating a model of a belief associated with the of the other agent and how that agent may behave. The updating of the root on line 8 of the Game Theoretic Planning Algorithm Overview may be considered as updating the root based on a real action already taken.

Figure 3:
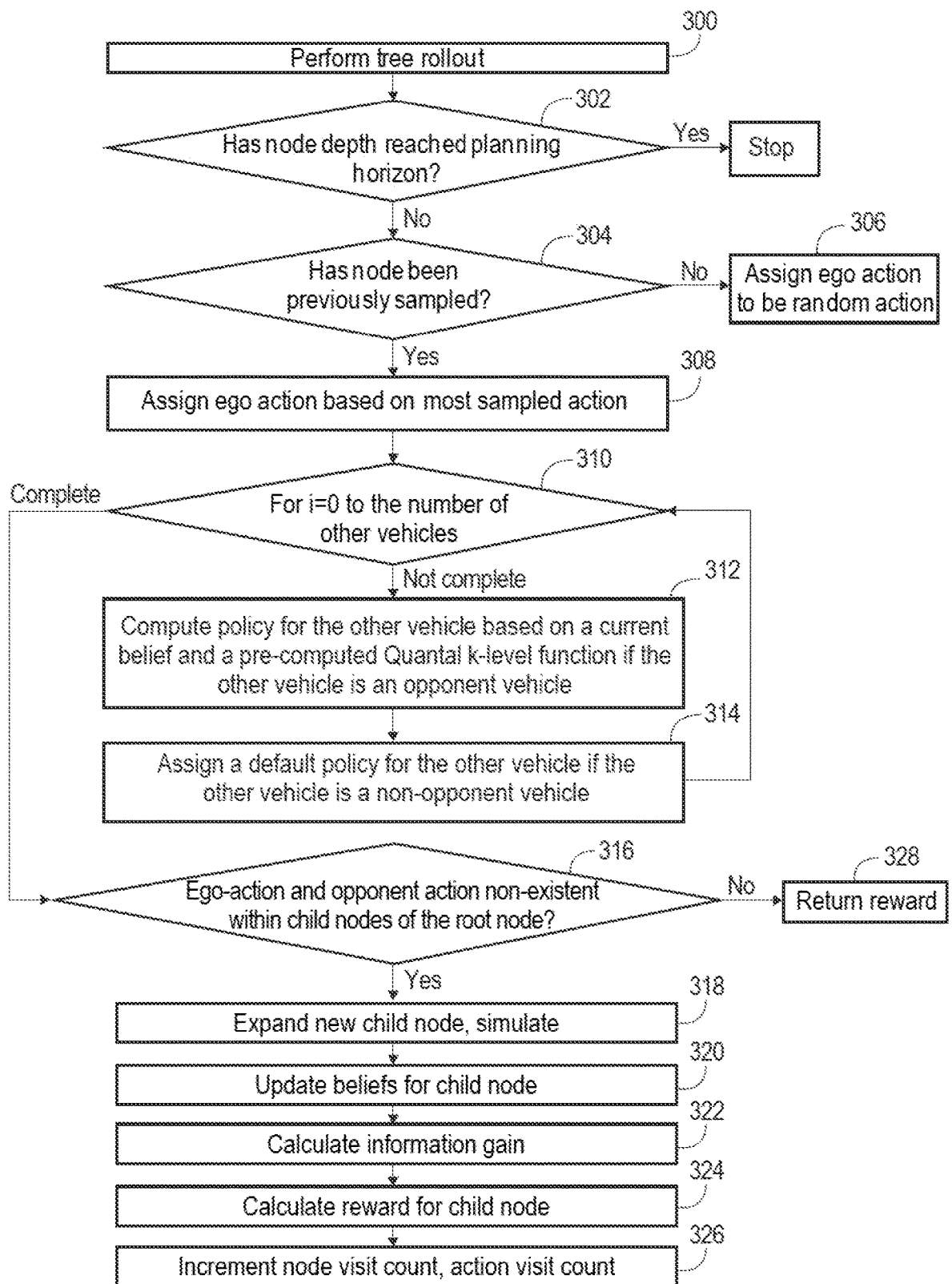
FIG. 3 is an exemplary flow diagram of a method for game theoretic decision making, according to one aspect.

FIG. 3 is an exemplary flow diagram of a method for game theoretic decision making, according to one aspect. With reference to both FIG. 2 and FIG. 3, the tree rollout method 300 may be performed. A check 302 for the node depth may be performed to determine if the planning horizon has been reached (e.g., line 17 of the Game Theoretic Planning Algorithm Overview). If the planning horizon has been reached, the tree rollout method 300 stops. If the planning horizon has not yet been reached, a check 304 for whether the current node is unsampled may be performed (e.g., line 18 of the Game Theoretic Planning Algorithm Overview). In other words, the check 304 may be to determine whether a node has already been explored (e.g., sampled) or if it is the first time (e.g., unsampled) the node has been explored (e.g., a count of a number of times a node has previously been visited). If the node has not been previously sampled 306, a random action may be assigned as the ego-action (e.g., line 19 of the Game Theoretic Planning Algorithm Overview). If the node has been previously sampled 308, a most sampled action may be assigned as the ego-action or what appears to be the best action, accounting for noise based on confidence (e.g., line 21 of the Game Theoretic Planning Algorithm Overview). A loop 310 for a number of other vehicles may be performed for policy assignments based on whether the other vehicle is defined as an opponent (e.g., lines 22-34 of the Game Theoretic Planning Algorithm Overview). If the loop 310 is not complete, a policy may be computed 312 for an opponent vehicle based on QRE (e.g., lines 23-25 of the Game Theoretic Planning Algorithm Overview). Line 24 of the Game Theoretic Planning Algorithm Overview may represent computing the policy based on a current belief and Q, QRE, or quantal k-level reasoning corresponding to the opponent ID. Line 25 of the Game Theoretic Planning Algorithm Overview may represent sampling actions of the opponent associated with the opponent ID. If the loop 310 is not complete, a policy may be computed 314 for a non-opponent vehicle based on a default policy, such as by assuming a no-operation or no-op action (e.g., lines 26-27 of the Game Theoretic Planning Algorithm Overview).

If the loop 310 is complete, a check 316 for child nodes may be performed (e.g., line 28 of the Game Theoretic Planning Algorithm Overview). If there is no child node exists, the reward is returned 328. If a state has not yet been expanded yet, the child nodes are expanded 318 and simulated (e.g., line 28 of the Game Theoretic Planning Algorithm Overview), otherwise the processor 102 may go to the expanded node. Additionally, a tree rollout may be performed for the child node (e.g., line 30 of the Game Theoretic Planning Algorithm Overview) to determine the reward associated with stepping to that child. Line 31 of the Game Theoretic Planning Algorithm Overview may represent updating or incrementing a visit count associated with the current node while line 32 of the Game Theoretic Planning Algorithm Overview may represent updating or incrementing an action count associated with the current node and/or selecting a specific action at the current node. Node expansion 318 may include simulating based on actions (e.g., line 37 of the Game Theoretic Planning Algorithm Overview), updating beliefs 320 (e.g., line 38 of the Game Theoretic Planning Algorithm Overview), calculating information gain 322 (e.g., line 39 of the Game Theoretic Planning Algorithm Overview), calculating the reward 324 for the child node (e.g., line 40 of the Game Theoretic Planning Algorithm Overview), returning the child node (e.g., line 41 of the Game Theoretic Planning Algorithm Overview). Thereafter, the node visit count and action visit count may be incremented 326 (e.g., lines 31-33 of the Game Theoretic Planning Algorithm Overview) and the reward is returned 328.

Figure 4:
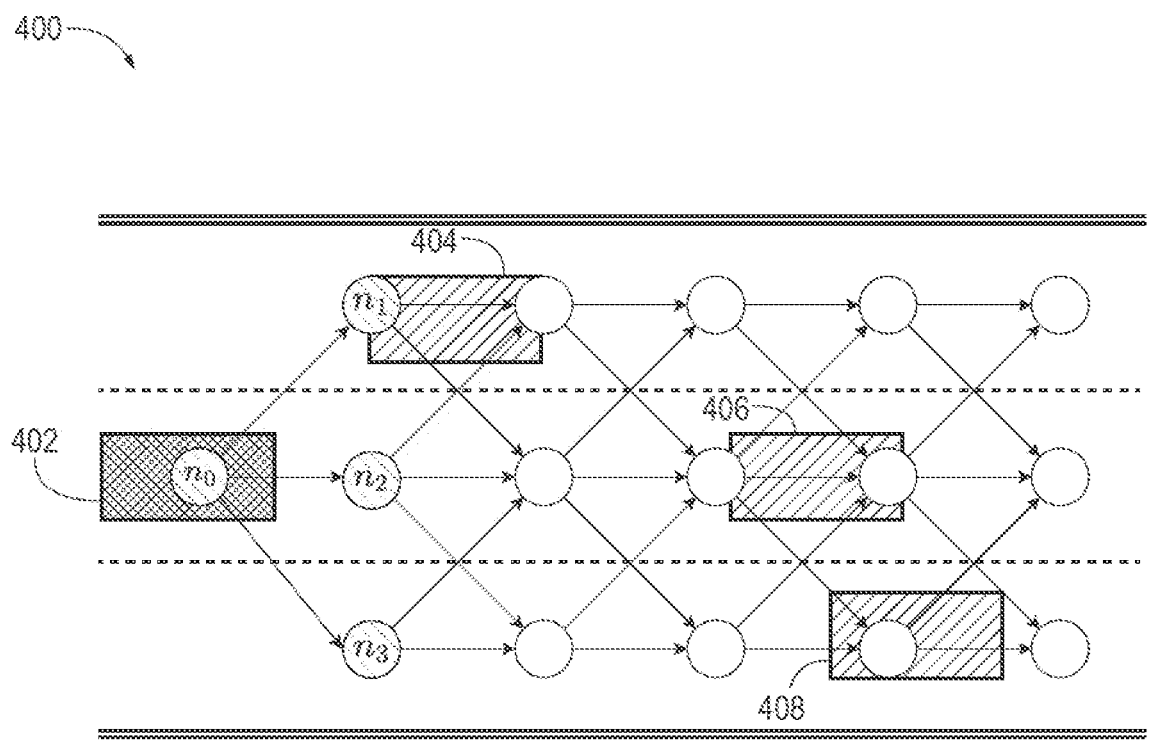
FIG. 4 is an exemplary illustration of a scenario associated with game theoretic decision making, according to one aspect.

FIG. 4 is an exemplary illustration of a scenario 400 associated with game theoretic decision making, according to one aspect. In FIG. 4, an exemplary ego-vehicle 402 is shown with three other agents or human drivers 404, 406, 408.

Figure 5:
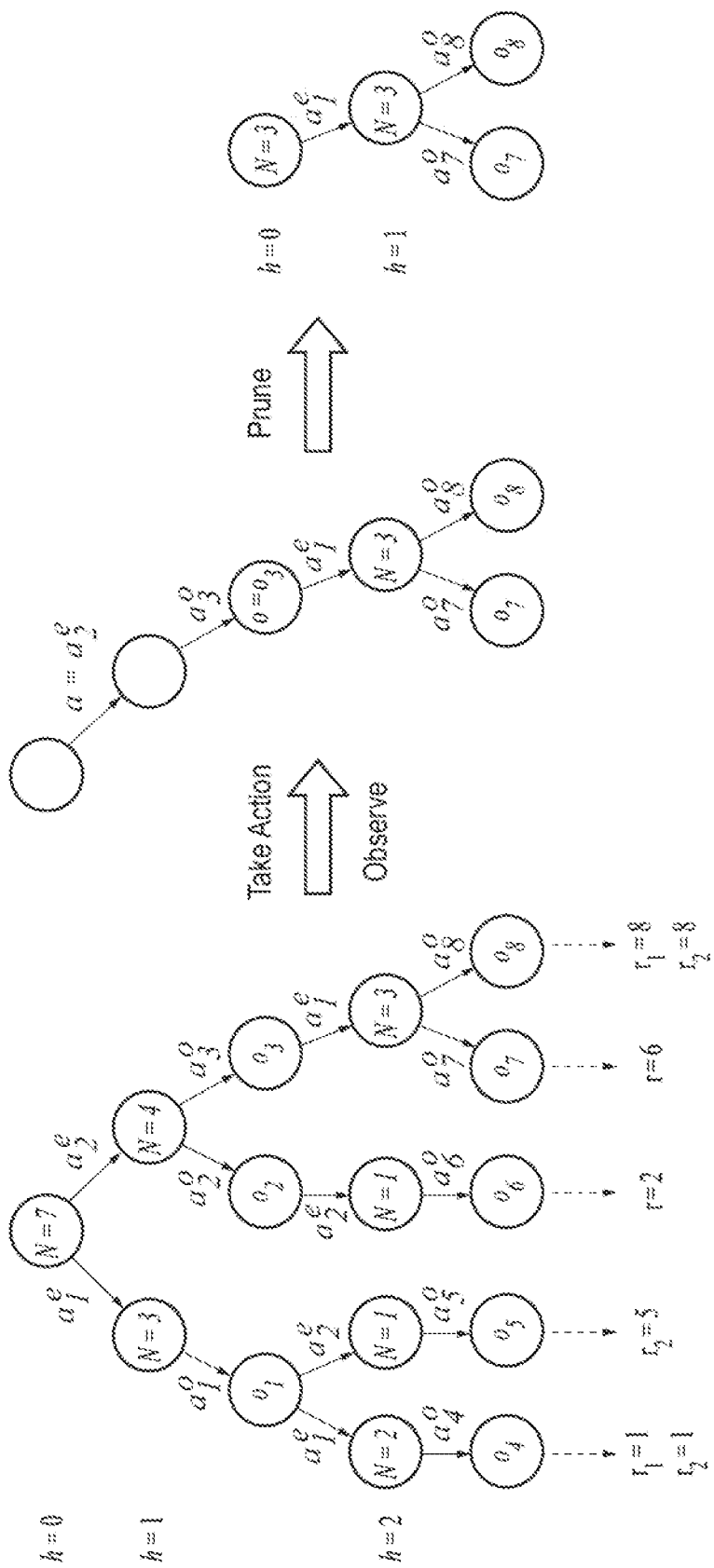
FIG. 5 is an exemplary illustration of a search tree associated with game theoretic decision making, according to one aspect.

FIG. 5 is an exemplary illustration of a search tree associated with game theoretic decision making, according to one aspect. FIG. 5 is an exemplary illustration of one search step of the algorithm with planning horizon H=2 and two available ego-vehicle actions.

The leftmost graph shows the search tree after conducting seven rollouts within the time allowance T (e.g., line 12 of the Game Theoretic Planning Algorithm Overview), where h denotes the depth, N denotes the total number of times a node has been expanded, and r denotes the total reward of a rollout trajectory. $ae_1$ and $ae_2$ may represent the two available ego-actions, and $a_i^o$ includes the actions of all other vehicles or ego-agents. After the algorithm decides that $a_2$ is the desired action to take at the current time step, it executes $a_2^e$ and receives a real observation from the environment. The algorithm identifies the real observation $o=o_3$, hence it prunes the section of the search tree that may be no longer possible and reassigns the root node.

Figure 6:
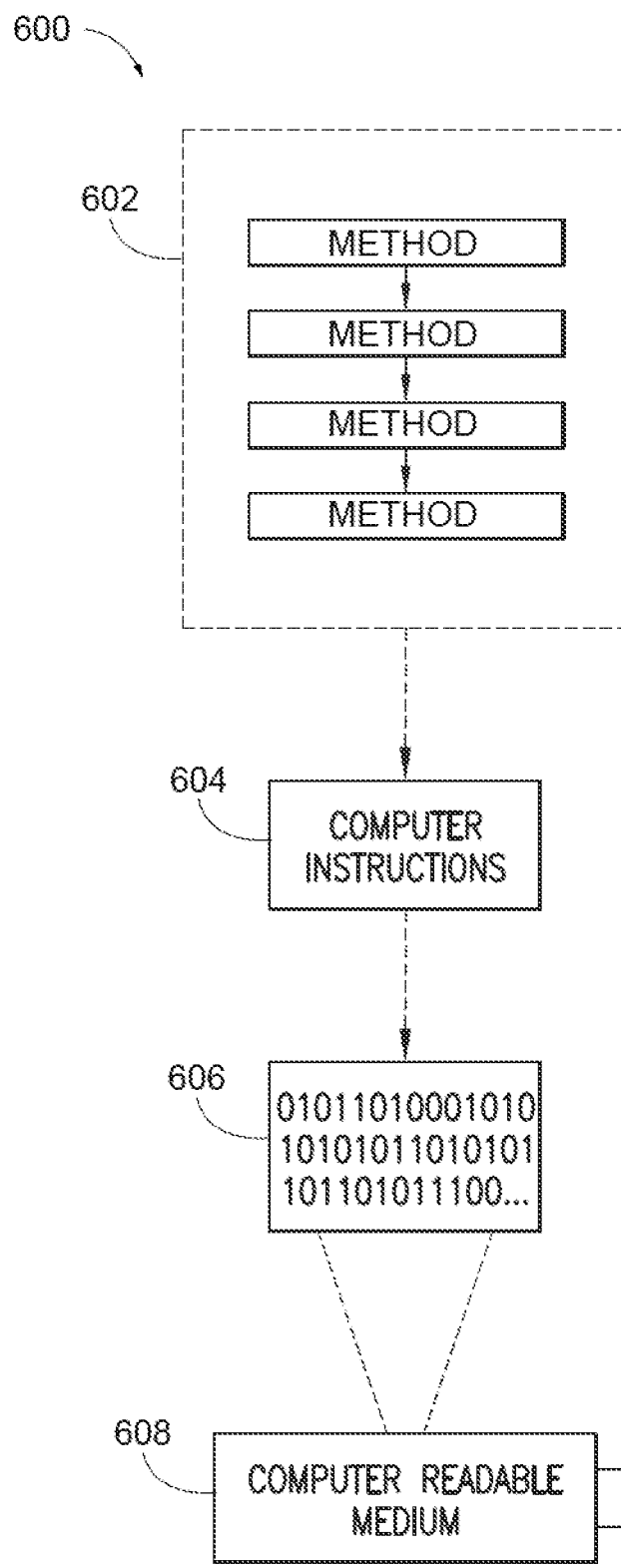
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 200 of FIG. 2 or the method 300 of FIG. 3. In another aspect, the processor-executable computer instructions 604 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
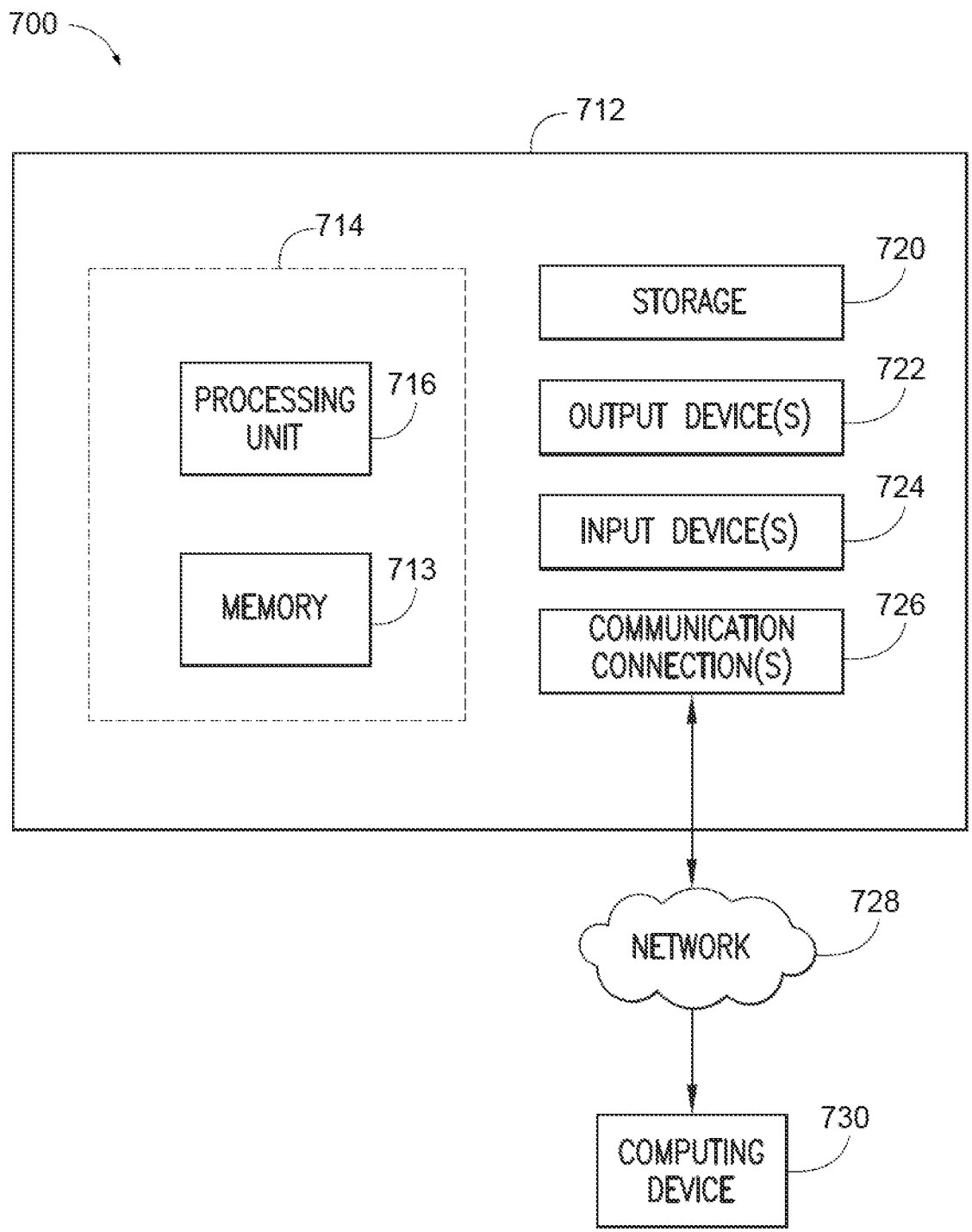
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by the at least one processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for game theoretic decision making, comprising:
   a sensor detecting one or more other vehicles and corresponding attributes as an observation;
   a memory storing one or more instructions;
   a processor executing one or more of the instructions stored on the memory to perform:
   constructing a search tree based on the observation, an initial belief, and a vehicle identified as a current opponent vehicle;
   performing a Monte Carlo Tree Search (MCTS) on the search tree based on a planning horizon and a time allowance to determine a desired action from a set of ego-actions;
   executing, via one or more vehicle systems, the desired action, wherein the desired action include one or more of a lane change, an acceleration action, a deceleration action, or a stopping action;
   detecting, via the sensor, an updated observation associated with one or more of the other vehicles;
   identifying one or more of the other vehicles to be updated as the current opponent vehicle; and
   updating a root node of the search tree based on the current opponent vehicle.

2. The system for game theoretic decision making of claim 1, wherein the performing the MCTS on the search tree includes performing a tree rollout based on the root node of the search tree and the planning horizon to expand, simulate, and backpropagate the search tree.

3. The system for game theoretic decision making of claim 2, wherein the performing the tree rollout includes prioritizing unsampled actions.

4. The system for game theoretic decision making of claim 1, comprising computing, via the processor, a policy for the current opponent vehicle based on a current belief and a pre-computed Quantal Level-k function.

5. The system for game theoretic decision making of claim 4, comprising sampling, via the processor, one or more opponent actions from the policy for the current opponent vehicle.

6. The system for game theoretic decision making of claim 1, comprising assigning, via the processor, a default action to non-opponent vehicles of the one or more other vehicles.

7. The system for game theoretic decision making of claim 2, wherein the expanding the search tree includes generating a child node for a current node based on an ego-action and an opponent action being non-existent within one or more child nodes of the root node.

8. The system for game theoretic decision making of claim 7, comprising calculating, via the processor, a reward associated with the child node based on a reward function, a discount factor, and an information gain.

9. The system for game theoretic decision making of claim 8, wherein the information gain is represented by a difference in entropy between the current node and the child node.

10. The system for game theoretic decision making of claim 8, wherein the information gain is represented by a difference in entropy between a belief associated with the current node and a belief associated with the child node.

11. A computer-implemented method for game theoretic decision making, comprising:
  detecting, via a sensor, one or more other vehicles and corresponding attributes as an observation;
  constructing a search tree based on the observation, an initial belief, and a vehicle identified as a current opponent vehicle;
  performing a Monte Carlo Tree Search (MCTS) on the search tree based on a planning horizon and a time allowance to determine a desired action from a set of ego-actions;
  executing, via one or more vehicle systems, the desired action, wherein the desired action include one or more of a lane change, an acceleration action, a deceleration action, or a stopping action;
  detecting, via the sensor, an updated observation associated with one or more of the other vehicles;
  identifying one or more of the other vehicles to be updated as the current opponent vehicle; and
  updating a root node of the search tree based on the current opponent vehicle.

12. The computer-implemented method for game theoretic decision making of claim 11, wherein the performing the MCTS on the search tree includes performing a tree rollout based on the root node of the search tree and the planning horizon to expand, simulate, and backpropagate the search tree.

13. The computer-implemented method for game theoretic decision making of claim 12, wherein the performing the tree rollout includes prioritizing unsampled actions.

14. The computer-implemented method for game theoretic decision making of claim 11, comprising computing a policy for the current opponent vehicle based on a current belief and a pre-computed Quantal Level-k function.

15. The computer-implemented method for game theoretic decision making of claim 14, comprising sampling one or more opponent actions from the policy for the current opponent vehicle.

16. The computer-implemented method for game theoretic decision making of claim 11, comprising assigning a default action to non-opponent vehicles of the one or more other vehicles.

17. A game theoretic decision making vehicle, comprising:
  one or more vehicle systems;
  a sensor detecting one or more other vehicles and corresponding attributes as an observation;
  a memory storing one or more instructions;
  a processor executing one or more of the instructions stored on the memory to perform:
  constructing a search tree based on the observation, an initial belief, and a vehicle identified as a current opponent vehicle;
  performing a Monte Carlo Tree Search (MCTS) on the search tree based on a planning horizon and a time allowance to determine a desired action from a set of ego-actions;
  executing, via one or more of the vehicle systems, the desired action, wherein the desired action include one or more of a lane change, an acceleration action, a deceleration action, or a stopping action;
  detecting, via the sensor, an updated observation associated with one or more of the other vehicles;
  identifying one or more of the other vehicles to be updated as the current opponent vehicle; and
  updating a root node of the search tree based on the current opponent vehicle.

18. The game theoretic decision making vehicle of claim 17, wherein the performing the MCTS on the search tree includes performing a tree rollout based on the root node of the search tree and the planning horizon to expand, simulate, and backpropagate the search tree.

19. The game theoretic decision making vehicle of claim 18, wherein the performing the tree rollout includes prioritizing unsampled actions.

20. The game theoretic decision making vehicle of claim 17, comprising computing, via the processor, a policy for the current opponent vehicle based on a current belief and a pre-computed Quantal Level-k function.

* * * * *